(12) United States Patent
Chen et al.

(10) Patent No.: US 7,658,544 B2
(45) Date of Patent: Feb. 9, 2010

(54) LINEAR MOTION GUIDE APPARATUS HAVING CHANGEABLE WIPER

(75) Inventors: Tsung Jen Chen, Taichung (TW); Chiung Hui Tsai, Taichung (TW)

(73) Assignee: Hiwin Technologies Corp., Situn Taichung (TW)

( * ) Notice: Subject to any disclaimer, the term of this patent is extended or adjusted under 35 U.S.C. 154(b) by 394 days.

(21) Appl. No.: 11/725,656

(22) Filed: Mar. 20, 2007

(65) Prior Publication Data

US 2008/0232725 A1 Sep. 25, 2008

(51) Int. Cl.
*F16C 29/06* (2006.01)
(52) U.S. Cl. .......................................... 384/15; 384/45
(58) Field of Classification Search .................. 384/15, 384/45
See application file for complete search history.

(56) References Cited

U.S. PATENT DOCUMENTS

| | | | |
|---|---|---|---|
| 4,886,376 A | 12/1989 | Osawa | 384/15 |
| 5,149,204 A * | 9/1992 | Tennichi | 384/15 |
| 5,634,722 A | 6/1997 | Yuasa et al. | 384/15 |
| 6,106,154 A | 8/2000 | Agari | 384/15 |
| 6,558,039 B2 * | 5/2003 | Wu | 384/45 |
| 6,715,920 B2 * | 4/2004 | Menges et al. | 384/45 |
| 2008/0159669 A1 * | 7/2008 | Chen et al. | 384/15 |

* cited by examiner

*Primary Examiner*—Thomas R Hannon
(74) *Attorney, Agent, or Firm*—Charles E. Baxley (57) ABSTRACT

A linear motion guide device includes a slider slidably attached onto a guide rail, an end cap and a wiper attached to the slider, the wiper includes one or more pegs engaged with the end cap for anchoring the wiper to the end cap, and includes one or more latches for resiliently engaging with the end cap and for detachably anchoring the wiper to the end cap and for allowing the wiper to be easily and readily attached to the end cap or disengaged from the end cap without additional tools, the end cap includes a shoulder formed in the outer peripheral portion, and the wiper includes an outer peripheral fence for engaging with the peripheral shoulder of the end cap and for anchoring the wiper to the end cap.

15 Claims, 7 Drawing Sheets

LINEAR MOTION GUIDE APPARATUS HAVING CHANGEABLE WIPER

BACKGROUND OF THE INVENTION

1. Field of the Invention

The present invention relates to a linear motion guide apparatus, and more particularly to a linear motion guide apparatus including a wiper designed and arranged to be easily and readily attached to or disengaged from the linear motion guide apparatus without additional tools.

2. Description of the Prior Art

Typical linear motion guide devices comprise a slider or slide block slidably attached onto a guide rail, and normally, a ball bearing device disposed between the slider and the guide rail for facilitating the sliding movement between the slider and the guide rail and for allowing the slider and the guide rail to be smoothly moved relative to each other.

For example, U.S. Pat. No. 4,886,376 to Osawa discloses one of the typical linear motion rolling guide units comprising a slider or slide block slidably attached onto a guide rail, and a dust proof seal attached onto the slide block and having a soft rubber member for engaging with the guide rail and for making a tight seal between the slide block and the guide rail and for wiping off the dust or particles or the like that may be engaged into the space formed between the slide block and the guide rail.

However, the dust proof seal is normally solidly secured onto an end cap or the slide block with four or more fasteners, and it takes a long time to fasten and to unfasten the fasteners onto and from the dust proof seal.

U.S. Pat. No. 5,634,722 to Yuasa et al., and U.S. Pat. No. 6,106,154 to Agari disclose two further typical linear motion rolling guide units each also comprising a slider or slide block slidably attached onto a guide rail, and one or more end seals or wiper devices attached onto the slide block or the end caps and having a soft rubber lips or lip portions for engaging with the guide rail and for making a tight seal between the slide block and the guide rail and for wiping off the dust or particles or the like that may be engaged into the space formed between the slide block and the guide rail.

However, similarly, the dust proof wipers or end seals are also solidly secured onto the end cap or the slide block with four or more fasteners, and it will also take a long time to fasten and to unfasten the fasteners onto and from the dust proof seal.

The present invention has arisen to mitigate and/or obviate the afore-described disadvantages of the conventional linear motion guide devices.

SUMMARY OF THE INVENTION

The primary objective of the present invention is to provide a linear motion guide apparatus including a wiper designed and arranged to be easily and readily attached to or disengaged from the linear motion guide apparatus without additional tools.

In accordance with one aspect of the invention, there is provided a linear motion guide apparatus comprising a guide rail, a slider slidably attached onto the guide rail for moving along the guide rail, an end cap attached to the slider, and a wiper including a wiping member having a channel formed therein for slidably receiving and engaging with the guide rail, and including at least one peg extended therefrom for engaging with the end cap and for anchoring and positioning the wiper to the end cap, and including at least one latch extended from the wiper for resiliently engaging with the end cap and for detachably anchoring and positioning the wiper to the end cap without tools.

The end cap includes a peripheral shoulder formed therein, and the wiper includes an outer peripheral fence for forming a depression and for engaging with the peripheral shoulder of the end cap and for anchoring the wiper to the end cap. The peg of the wiper is extended from the outer peripheral fence of the wiper.

The end cap includes a rib extended therefrom for forming a slot therein, and at least one passage formed in the rib, and the wiper includes a catch extended from the outer peripheral fence for engaging into the passage of the rib of the end cap. The end cap includes a notch formed in the rib and communicating with the slot and the peripheral shoulder of the end cap for engaging with the catch of the wiper.

The end cap includes at least one indentation formed therein for engaging with the peg of the wiper. The end cap includes at least one conduit formed therein for engaging with the latch of the wiper. The conduit of the end cap is formed through an upper portion of the end cap.

The end cap includes a depression formed in an upper portion of the end cap and communicating with the conduit of the end cap. The end cap includes a stop extended into the conduit of the end cap for engaging with the latch of the wiper. The latch of the wiper includes an inclined surface formed therein for engaging with the stop of the end cap.

The wiping member includes a groove formed in an inner peripheral portion of the wiping member for forming an inner peripheral flange. The wiper includes a compartment formed therein and aligned with the latch for increasing a resilience of the latch. The wiper includes a number of swellings extended into the compartment of the wiper for allowing the wiper and the at last one latch to be frictionally depressed by a user.

The wiper includes an opening formed therein, and the end cap includes a mouth attached thereto and engaged through the opening of the wiper. The end cap includes a flange extended therefrom for engaging with the wiper and for anchoring the wiper to the end cap.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
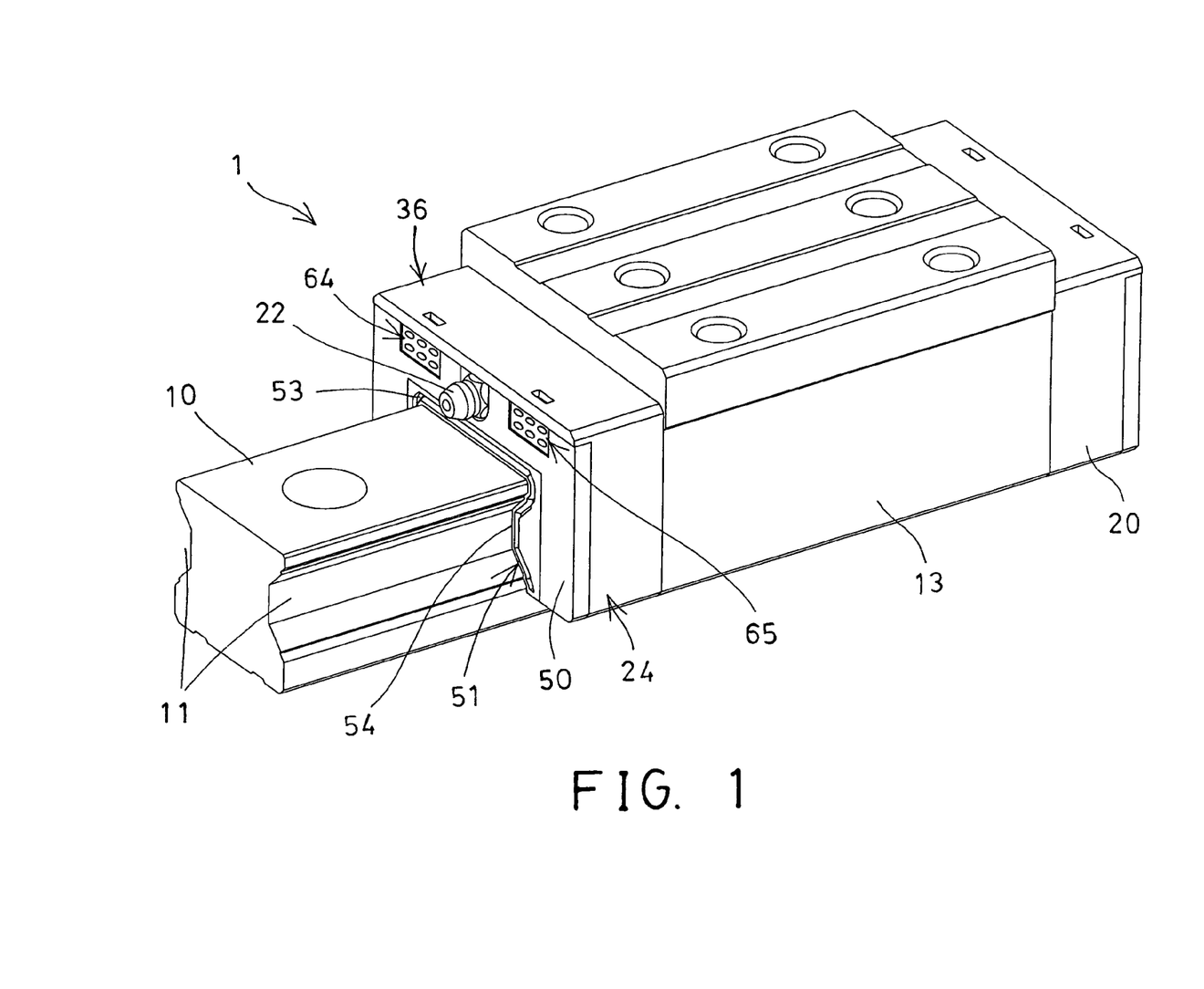
FIG. 1 is a perspective view of a linear motion guide apparatus in accordance with the present invention.

Referring to the drawings, and initially to FIG. 1, a linear motion guide apparatus 1 in accordance with the present invention comprises a guide rail 10 including a substantially I-shaped cross section having two longitudinal recesses 11 formed in the side portions thereof, and a slide block or a slider 13 slidably attached onto the guide rail 10 and arranged to be moved along the guide rail 10, and normally, a ball bearing device (not shown) disposed between the slider 13 and the guide rail 10 for facilitating the sliding movement between the slider 13 and the guide rail 10 and for allowing the slider 13 and the guide rail 10 to be smoothly moved relative to each other. Two end caps 20 are disposed on the two sides or end portions or outer portions of the slider 13 and attached or secured to the slider 13 with such as fasteners or latches (not shown) or the like.

The linear motion guide apparatus 1 in accordance with the present invention further includes two dust caps or wipers 50 disposed on the outer portions of the end caps 20 and to be detachably attached or secured onto the end caps 20 without additional tools. The ball bearing device (not shown) and the slider 13 are not related to the present invention and will not be described in further details. The end caps 20 each include a channel 21 formed in the lower portion thereof (FIG. 3) for slidably receiving or engaging onto the guide rail 10, and one of the end caps 20 may include a mouth 22 attached thereto (FIGS. 1-3) for such as filling lubricant into the end caps 20 and for lubricating the ball bearing device (not shown). One example for detachably attaching or securing the wipers 50 onto the end caps 20 will be described hereinafter with reference to FIGS. 2-10.

The end caps 20 each include a depression or peripheral shoulder 23 formed therein (FIGS. 3, 5, 7, 10), such as formed in the outer peripheral portion of the end caps 20 and facing away from the slider 13, and formed in the two side portions 24 and/or the lower portion 25 of the end caps 20, and each include one or more (such as two) indentations 26, 27 formed in the lower portion of the end caps 20 and communicating with the peripheral shoulder 23 of the end caps 20, and each include a slot 28 formed in each of the side portions 24 of the end caps 20 and communicating with the peripheral shoulder 23 of the end caps 20 and formed or defined by a rib 29 (FIG. 3), or each include a rib 29 extended therefrom for forming the slot 28 thereof, and each include one or more passages 30, 31 formed in the ribs 29 respectively and communicating with the peripheral shoulder 23 of the end caps 20, and each include one or more notches 32, 33 formed in the ribs 29 respectively and communicating with the slots 28 and the peripheral shoulder 23 of the end caps 20.

The end caps 20 each further include one or more (such as two) depressions 34, 35 formed in the upper portion 36 of the end caps 20, and one or more (such as two) conduits 37, 38 also formed in the upper portion 36 of the end caps 20 and communicating with the respective depressions 34, 35 thereof, and preferably but not necessarily formed through the upper portion 36 of the end caps 20. The end caps 20 each further include one or more (such as two) stops 39 extended into the respective conduits 37, 38 of the end caps 20 (FIGS. 7-10), and a brim or flange 40 extended outwardly or laterally from the upper portion 36 of the end caps 20 and/or extended forwardly beyond the end caps 20 for engaging with the wipers 50 and for stably anchoring or positioning the wipers 50 to the end caps 20.

The wipers 50 each also include a channel 51 formed in the lower portion thereof (FIGS. 1-4) for slidably receiving or engaging onto the guide rail 10, and a substantially inverted U-shaped wiping member 52 attached to or formed in the inner peripheral portion thereof and for softly or resiliently engaging with the guide rail 10 and for wiping off the dust or particles or the like that may be engaged into the space formed between the slide block 13 and the guide rail 10. It is preferable that the channel 51 is formed in the lower portion of the wiping member 52 and having a shape corresponding to that of the guide rail 10 for snugly and softly or resiliently engaging onto the guide rail 10. The wipers 50 are preferably made of the plastic or rubber materials softer than that for the wiping members 52.

Figure 2:
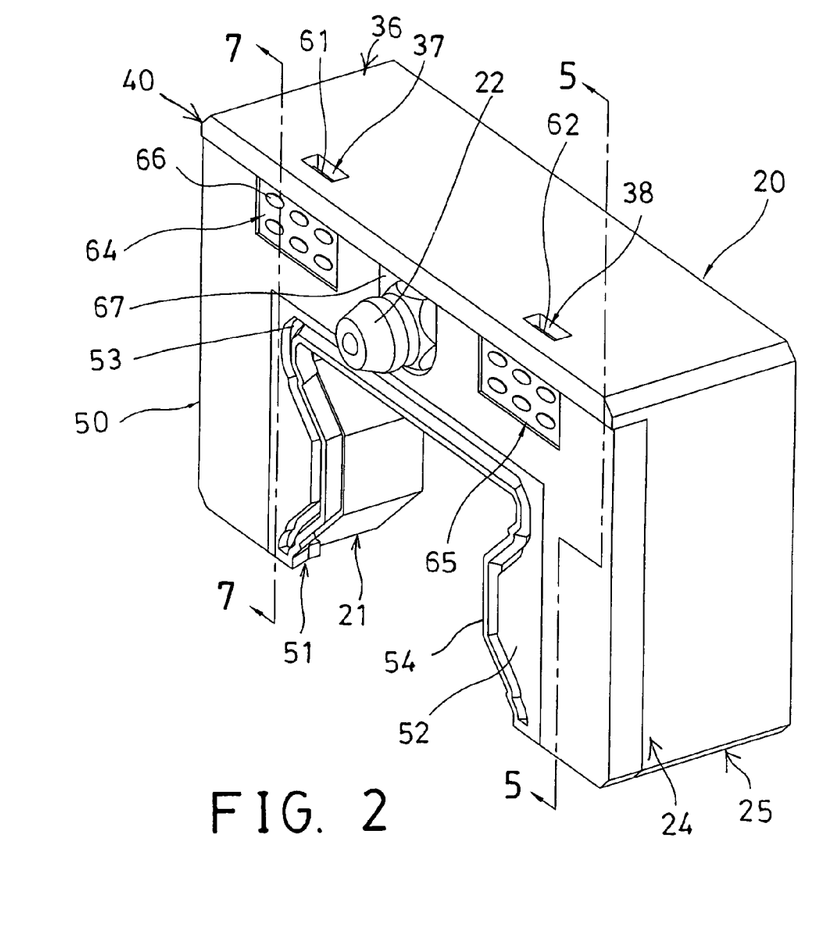
FIG. 2 is a perspective view illustrating an end cap and a dust wiper of the linear motion guide apparatus.
Figure 3:
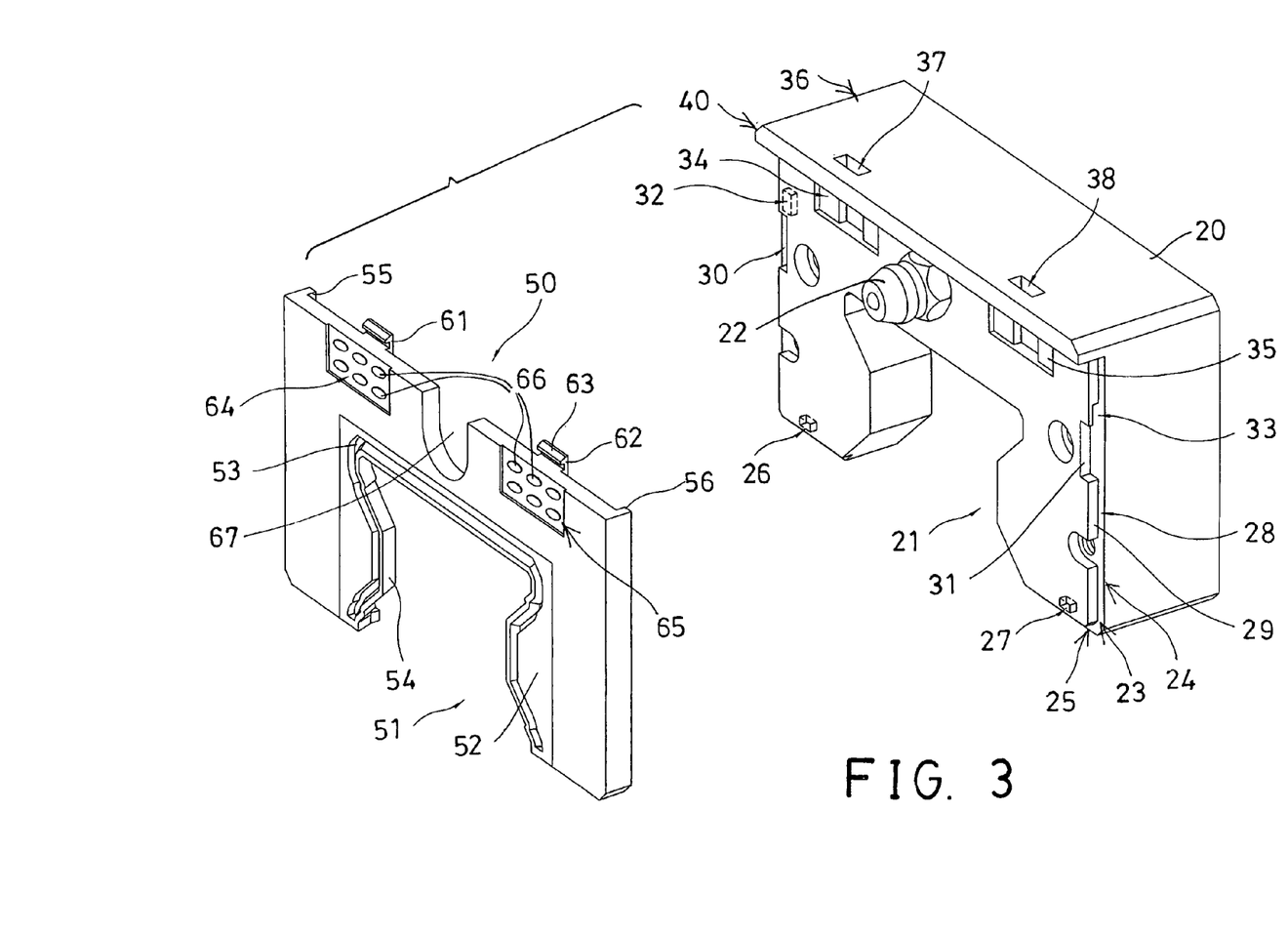
FIG. 3 is a partial exploded view illustrating the end cap and the dust wiper of the linear motion guide apparatus.
Figure 4:
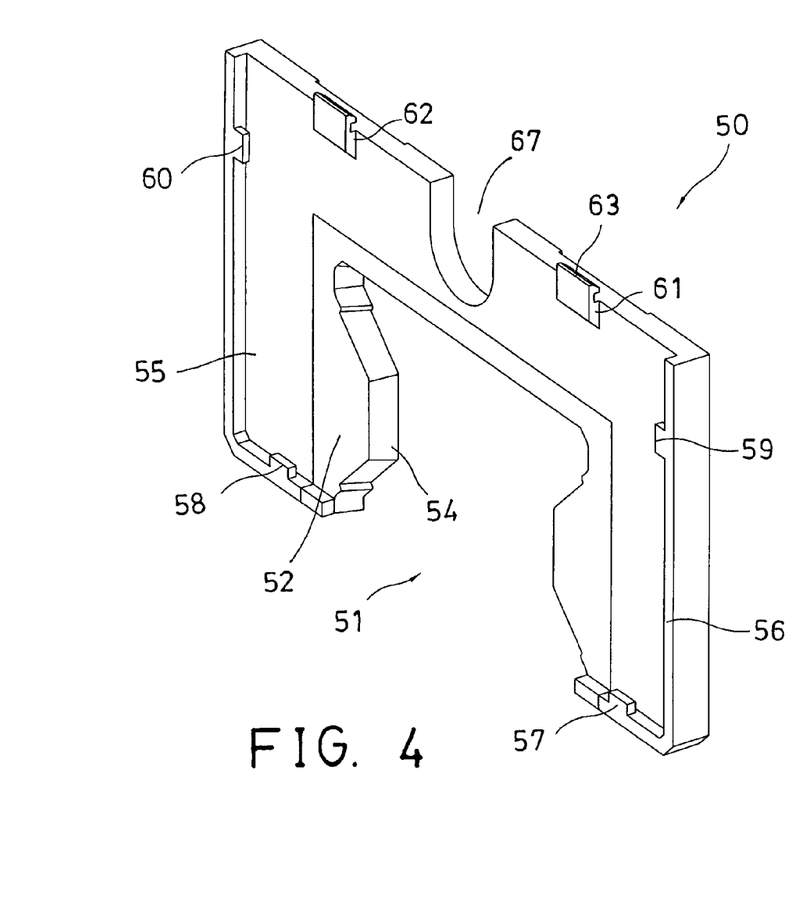
FIG. 4 is a rear perspective view illustrating the dust wiper of the linear motion guide apparatus.
Figure 5:
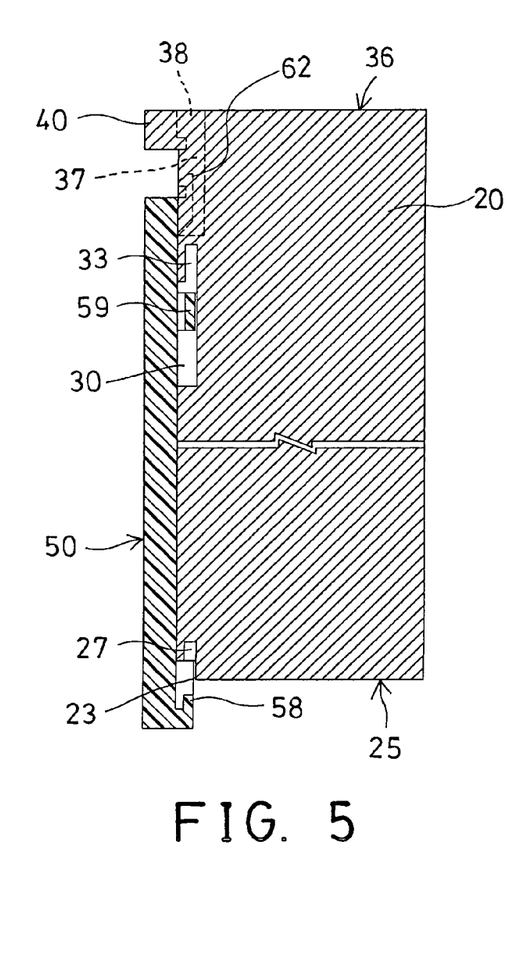
FIG. 5 is a cross sectional view of the linear motion guide apparatus taken along lines 5-5 of FIG. 2.
Figure 6:
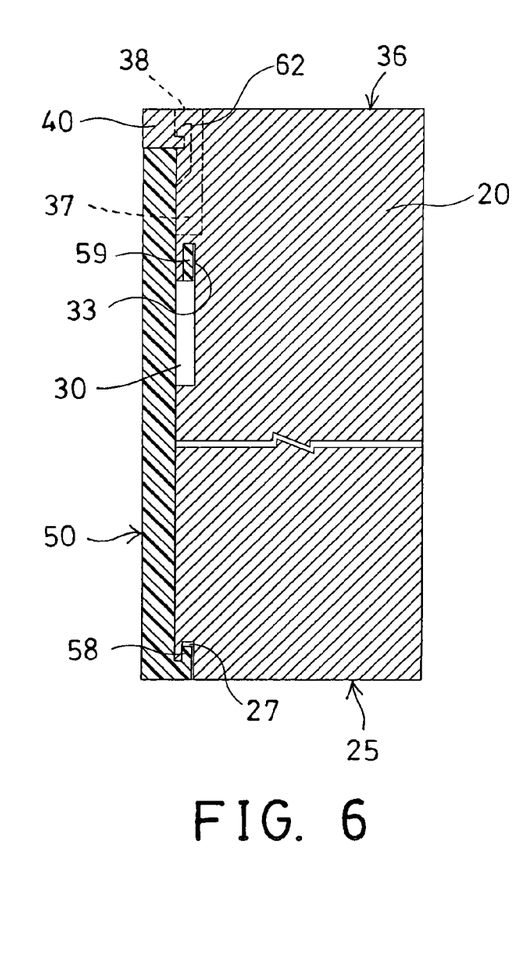
FIG. 6 is a cross sectional view similar to FIG. 5, illustrating the operation of the linear motion guide apparatus.
Figure 7:
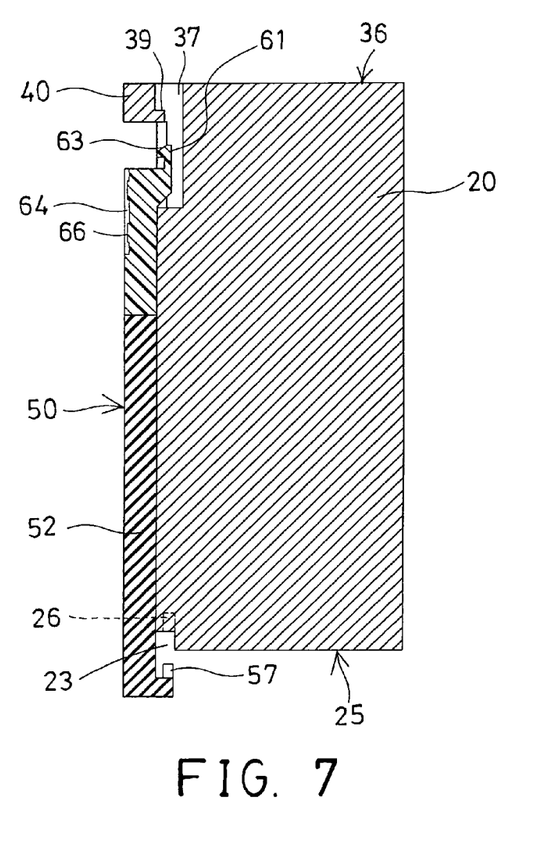
FIG. 7 is a cross sectional view of the linear motion guide apparatus taken along lines 7-7 of FIG. 2.
Figure 8:
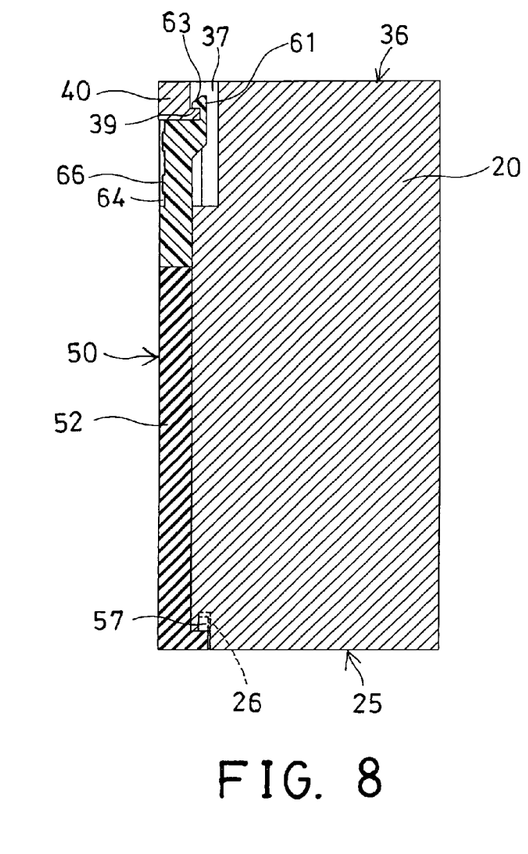
FIGS. 8, 9, 10 are cross sectional views similar to FIG. 7, illustrating the operation of the linear motion guide apparatus.

As shown in FIGS. 1-3, the wipers 50 each include a groove 53 formed in the inner peripheral portion of the wiping members 52 for forming or defining an inner peripheral flange 54, and an inclined surface (not shown) formed in the lower or inner portion of the inner peripheral flange 54 or the wiper 50 for forming a resilient structure to the inner peripheral flange 54 of the wiper 50 and for allowing the inner peripheral flange 54 of the wiper 50 to further softly or resiliently engaging with the guide rail 10. The wipers 50 each include a depression 55 formed in the inner portion thereof (FIGS. 3, 4) and defined or formed by an outer peripheral fence 56 which is formed or provided in the side portions and the lower or bottom portion of the wipers 50 for engaging with the end cap 20 and for anchoring or positioning the wipers 50 to the end caps 20 respectively.

For example, the outer peripheral fence 56 of the wipers 50 may be engaged with the peripheral shoulder 23 of the end caps 20, and/or the flanges 40 of the end caps 20 may be engaged with the wipers 50 such that wipers 50 may be stably anchored or positioned to the end caps 20 respectively. The wipers 50 each further include one or more (such as two) pegs 57, 58 extended therefrom, such as extended upwardly from the bottom portion of the outer peripheral fence 56 of the wipers 50 (FIGS. 4-6) for engaging into the corresponding indentations 26, 27 of the end caps 20 and thus for solidly anchoring and positioning the lower portion of the wiper 50 to the end cap 20 and for preventing the wiper 50 from being disengaged from the end cap 20.

The wipers 50 each further include one or more (such as two) catches 59, 60 extended therefrom, such as extended laterally from the side portions of the outer peripheral fence 56 of the wipers 50 for engaging through the passages 30, 31 of the ribs 29 of the end caps 20 respectively and then for engaging into the peripheral shoulder 23 of the end caps 20, and then for engaging into the corresponding notches 32, 33 of the ribs 29 and/or of the end caps 20 respectively when the pegs 57, 58 of the wipers 50 are engaged into the corresponding indentations 26, 27 of the end caps 20, and thus for further solidly anchoring and positioning the side portions of the wiper 50 to the end cap 20 and for further preventing the wiper 50 from being disengaged from the end cap 20.

Figure 9:
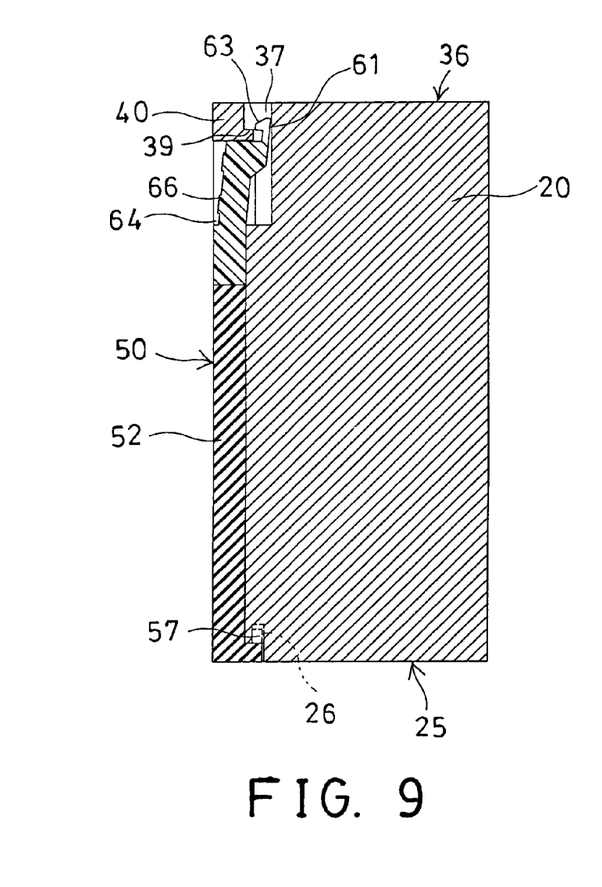

The wipers 50 each further include one or more (such as two) projections or latches 61, 62 extended upwardly therefrom for engaging into the corresponding conduits 37, 38 of the end caps 20 and then for allowing the latches 61, 62 to selectively engage with the stops 39 of the end caps 20 (FIGS. 7-8) or to be selectively disengaged from the stops 39 of the end caps 20 (FIGS. 9-10), and thus for detachably anchoring and positioning the upper portion of the wiper 50 to the end cap 20. The upper portion of the wiper 50 may be selectively disengaged form the end cap 20 when the latches 61, 62 are depressed and disengaged form the stops 39 of the end cap 20 (FIG. 9). It is preferable that the wiper 50 include an inclined surface 63 formed in each of the latches 61, 62 (FIGS. 3-4, 7-10) for allowing the latches 61, 62 to be easily and smoothly engaged with the stops 39 of the end cap 20.

It is further preferable that the wipers 50 each include one or more (such as two) voids or compartments 64, 65 formed in the upper portion thereof and aligned with the latches 61, 62 respectively for increasing the resilience of the latches 61, 62 and for forming the spring-biased latches 61, 62 and for allowing the latches 61, 62 to resiliently engage with the stops 39 of the end cap 20. It is preferable that the wipers 50 and/or the latches 61, 62 are made of the plastic or rubber materials for allowing the wipers 50 and/or the latches 61, 62 to be suitably depressed by the users, and for allowing the latches 61, 62 to be easily and smoothly engaged with or disengaged from the stops 39 of the end cap 20 without additional tools. The wipers 50 may further include a number of protrusions or bulges or swellings 66 extended into the compartments 64, 65 of the wiper 50 for allowing the wipers 50 and/or the latches 61, 62 to be suitably or frictionally depressed by the users, and may further include an opening 67 formed therein for receiving the mouth 22.

In operation, the outer peripheral fence 56 of the wipers 50 may first be engaged with the peripheral shoulder 23 of the end caps 20, and/or the pegs 57, 58 of the wipers 50 may first be engaged into the corresponding indentations 26, 27 of the end caps 20, and/or the catches 59, 60 of the wiper 50 may first be engaged through the passages 30, 31 of the ribs 29 of the end caps 20 respectively and then engaged into the peripheral shoulder 23 of the end caps 20, and then engaged into the corresponding notches 32, 33 of the ribs 29 and/or of the end caps 20 respectively (FIGS. 5, 6) for solidly anchoring and positioning the wipers 50 to the end caps 20. Simultaneously, the latches 61, 62 may be forced to resiliently engage with the stops 39 of the end cap 20 (FIGS. 7, 8) in order to lock or secure the wipers 50 to the end caps 20.

Figure 10:
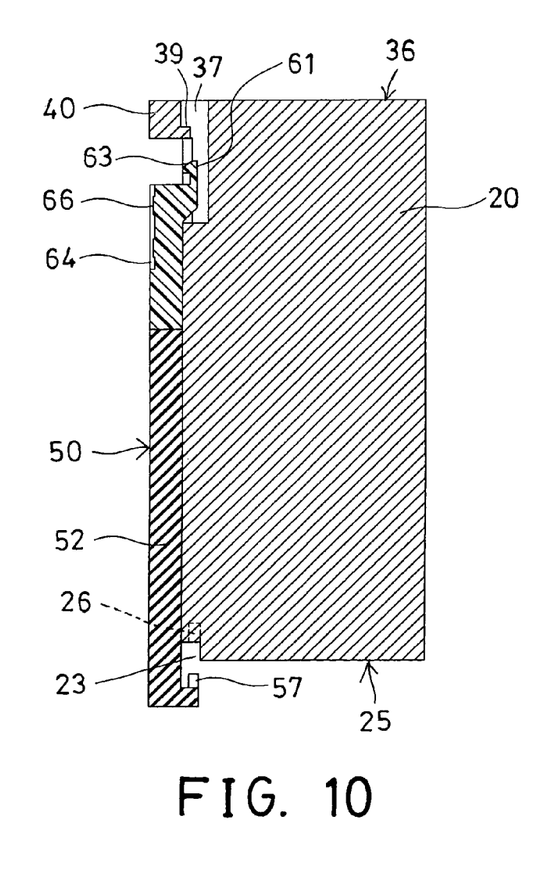

As shown in FIGS. 9 and 10, the wipers 50 and/or the latches 61, 62 may be suitably or frictionally depressed by the users in order to disengage the latches 61, 62 from the stops 39 of the end cap 20 and thus for allowing the upper portion of the wiper 50 to be disengaged from the stops 39 of the end cap 20 by depressing the wipers 50 and/or the latches 61, 62 without additional tools. The formation and the provision of the inclined surfaces 63 of the latches 61, 62 may facilitate the engagement of the latches 61, 62 with the stops 39 of the end caps 20 for allowing the latches 61, 62 to be suitably depressed and disengaged from the stops 39 of the end cap 20 and for detachably anchoring and positioning the wiper 50 to the end cap 20.

Accordingly, the linear motion guide apparatus in accordance with the present invention includes a wiper designed and arranged to be easily and readily attached to or disengaged from the linear motion guide apparatus without additional tools.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A linear motion guide apparatus comprising:
   a guide rail,
   a slider slidably attached onto said guide rail for moving along said guide rail,
   an end cap attached to said slider, and
   a wiper including a wiping member having a channel formed therein for slidably receiving and engaging with said guide rail, and including at least one peg extended therefrom for engaging with said end cap and for anchoring and positioning said wiper to said end cap, and including at least one latch extended from said wiper for resiliently engaging with said end cap and for detachably anchoring and positioning said wiper to said end cap without tools, and said end cap including at least one indentation formed therein for engaging with said at least one peg of said wiper.

2. The linear motion guide apparatus as claimed in claim 1, wherein said wiper includes an opening formed therein, and said end cap includes a mouth attached thereto and engaged through said opening of said wiper.

3. The linear motion guide apparatus as claimed in claim 1, wherein said end cap includes a flange extended therefrom for engaging with said wiper and for anchoring said wiper to said end cap.

4. A linear motion guide apparatus comprising:
   a guide rail,
   a slider slidably attached onto said guide rail for moving along said guide rail,
   an end cap attached to said slider, said end cap including a peripheral shoulder formed therein, and
   a wiper including a wiping member having a channel formed therein for slidably receiving and engaging with said guide rail, and including at least one peg extended therefrom for engaging with said end cap and for anchoring and positioning said wiper to said end cap, and including at least one latch extended from said wiper for resiliently engaging with said end cap and for detachably anchoring and positioning said wiper to said end cap without tools, and said wiper including an outer peripheral fence for forming a depression and for engaging with said peripheral shoulder of said end cap and for anchoring said wiper to said end cap.

5. The linear motion guide apparatus as claimed in claim 4, wherein said at least one peg of said wiper is extended from said outer peripheral fence of said wiper.

6. The linear motion guide apparatus as claimed in claim 4, wherein said end cap includes a rib extended therefrom for forming a slot therein, and at least one passage formed in said rib, and said wiper includes a catch extended from said outer peripheral fence for engaging into said at least one passage of said rib of said end cap.

7. The linear motion guide apparatus as claimed in claim 6, wherein said end cap includes a notch formed in said rib and communicating with said slot and said peripheral shoulder of said end cap for engaging with said catch of said wiper.

8. A linear motion guide apparatus comprising:
   a guide rail,
   a slider slidably attached onto said guide rail for moving along said guide rail,
   an end cap attached to said slider, and
   a wiper including a wiping member having a channel formed therein for slidably receiving and engaging with said guide rail, and including at least one peg extended therefrom for engaging with said end cap and for anchoring and positioning said wiper to said end cap, and including at least one latch extended from said wiper for resiliently engaging with said end cap and for detachably anchoring and positioning said wiper to said end cap without tools, and said end cap including at least one conduit formed therein for engaging with said at least one latch of said wiper.

9. The linear motion guide apparatus as claimed in claim 8, wherein said at least one conduit of said end cap is formed through an upper portion of said end cap.

10. The linear motion guide apparatus as claimed in claim 8, wherein said end cap includes a depression formed in an upper portion of said end cap and communicating with said at least one conduit of said end cap.

11. The linear motion guide apparatus as claimed in claim 8, wherein said end cap includes a stop extended into said at least one conduit of said end cap for engaging with said at least one latch of said wiper.

12. The linear motion guide apparatus as claimed in claim 11, wherein said at least one latch of said wiper includes an inclined surface formed therein for engaging with said stop of said end cap.

13. A linear motion guide apparatus comprising:
a guide rail,
a slider slidably attached onto said guide rail for moving along said guide rail,
an end cap attached to said slider, and
a wiper including a wiping member having a channel formed therein for slidably receiving and engaging with said guide rail, and including at least one peg extended therefrom for engaging with said end cap and for anchoring and positioning said wiper to said end cap, and including at least one latch extended from said wiper for resiliently engaging with said end cap and for detachably anchoring and positioning said wiper to said end cap without tools, and said wiping member including a groove formed in an inner peripheral portion of said wiping member for forming an inner peripheral flange.

14. A linear motion guide apparatus comprising:
a guide rail,
a slider slidably attached onto said guide rail for moving along said guide rail,
an end cap attached to said slider, and
a wiper including a wiping member having a channel formed therein for slidably receiving and engaging with said guide rail, and including at least one peg extended therefrom for engaging with said end cap and for anchoring and positioning said wiper to said end cap, and including at least one latch extended from said wiper for resiliently engaging with said end cap and for detachably anchoring and positioning said wiper to said end cap without tools, and said wiper including a compartment formed therein and aligned with said at least one latch for increasing a resilience of said at least one latch.

15. The linear motion guide apparatus as claimed in claim 14, wherein said wiper includes a plurality of swellings extended into said compartment of said wiper for allowing said wiper and said at last one latch to be frictionally depressed by a user.

* * * * *